US012812593B2

(12) United States Patent
Sahin et al.

(10) Patent No.: US 12,812,593 B2
(45) Date of Patent: Nov. 24, 2026

(54) DEVICE POSITIONING

(71) Applicant: Nokia Technologies Oy, Espoo (FI)

(72) Inventors: Taylan Sahin, Munich (DE); Mikko Säily, Espoo (FI); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 155 days.

(21) Appl. No.: 18/691,233

(22) PCT Filed: Sep. 17, 2021

(86) PCT No.: PCT/EP2021/075574
§ 371 (c)(1),
(2) Date: Mar. 12, 2024

(87) PCT Pub. No.: WO2023/041169
PCT Pub. Date: Mar. 23, 2023

(65) Prior Publication Data
US 2024/0406931 A1 Dec. 5, 2024

(51) Int. Cl.
*H04W 64/00* (2009.01)

(52) U.S. Cl.
CPC ................................. *H04W 64/006* (2013.01)

(58) Field of Classification Search
CPC ..... H04W 72/25; H04W 92/18; H04W 72/40; H04W 64/006; H04W 4/02; H04W 4/029; H04W 64/003; H04W 4/025; H04W 72/21
See application file for complete search history.

(56) References Cited

U.S. PATENT DOCUMENTS

2019/0230618 A1 7/2019 Saur et al.
2019/0239181 A1 8/2019 Gangakhedkar et al.
(Continued)

FOREIGN PATENT DOCUMENTS

WO 2019/036578 A1 2/2019
WO 2019/145095 A1 8/2019
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
(Continued)

*Primary Examiner* — Kwasi Karikari
(74) *Attorney, Agent, or Firm* — LIPPES MATHIAS LLP

(57) ABSTRACT

According to an example aspect of the present invention, there is provided an apparatus, such as a user equipment, configured to receive from a wireless network node, or determine autonomously, a sidelink positioning reference signal configuration comprising a constraint set, the constraint set comprising at least one constraint, each of the at least one constraint being based on at least one of: a location of the apparatus, a time instant, a time duration, a radio measurement, a physical characteristic of surroundings of the apparatus, a state of motion of the apparatus and a connection status of the apparatus to a network, determine whether at least one constraint in the constraint set is satisfied, and responsive to the at least one constraint in the constraint set being satisfied, transmit to a mobile device a first sidelink positioning reference signal and/or receive a second sidelink positioning reference signal from the mobile device.

12 Claims, 7 Drawing Sheets

(56) References Cited

U.S. PATENT DOCUMENTS

| | | | | |
|---|---|---|---|---|
| 2021/0160712 | A1 | 5/2021 | Tadayon et al. | |
| 2021/0185632 | A1 | 6/2021 | Manolakos et al. | |
| 2021/0219103 | A1 | 7/2021 | Wang et al. | |
| 2022/0070924 | A1 * | 3/2022 | Choi | H04W 4/08 |
| 2023/0050701 | A1 * | 2/2023 | Bao | H04W 76/14 |

FOREIGN PATENT DOCUMENTS

| | | | |
|---|---|---|---|
| WO | 2019/197036 | A1 | 10/2019 |
| WO | 2020/198616 | A1 | 10/2020 |
| WO | 2020/246842 | A1 | 12/2020 |
| WO | 2021/057175 | A1 | 4/2021 |
| WO | 2021/092813 | A1 | 5/2021 |
| WO | 2021/118756 | A1 | 6/2021 |

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.5.0, Jun. 2021, pp. 1-120.

"Revised SID on Study on scenarios and requirements of in-coverage, partial coverage, and out-of-coverage positioning use cases", 3GPP TSG RAN Meeting #89e, RP-201518, Agenda Item: 9.7.12, LG Electronics, Sep. 14-18, 2020, 4 pages.

"3rd Generation Partnership Project; Technical Specification Group Radio Access Network; Study on NR Positioning Enhancements; (Release 17)", 3GPP TR 38.857, V0.1.0, Oct. 2020, pp. 1-19.

"Ranging-based service", TSG SA Meeting #SP-91E, SP-210212, Agenda Item: 6.7, SA WG1, Mar. 18-29, 2021, 3 pages.

"3rd Generation Partnership Project; Technical Specification Group Services and System Aspects; Study on Ranging-based Services (Release 18)", 3GPP TR 22.855, V1.0.0, Mar. 2021, 53 pages.

Msc-Generator, Sourceforge, Retrieved on Apr. 3, 2024, Webpage available at : https://sourceforge.net/projects/msc-generator/.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Radio Access Network; NR; Physical layer procedures for control (Release 16)", 3GPP TS 38.213, V16.6.0, Jun. 2021, pp. 1-187.

"3rd Generation Partnership Project; Technical Specification Group Radio Access Network; LTE Positioning Protocol (LPP) (Release 16)", 3GPP TS 37.355, V16.5.0, Jun. 2021, pp. 1-298.

"3rd Generation Partnership Project; Technical Specification Group Core Network and Terminals; SIP-I based circuit-switched core network; Stage 2 (Release 16)", 3GPP TS 23.231, V16.0.0, Jul. 2020, pp. 1-73.

"New SID: Study on use cases, scenarios, and requirements of sidelink positioning", 3GPP TSG RAN Meeting #88e, RP-201272, Agenda Item: 9.1, LG Electronics, Jun. 29-Jul. 3, 2020, 4 pages.

International Search Report and Written Opinion received for corresponding Patent Cooperation Treaty Application No. PCT/EP2021/075574, dated Jun. 14, 2022, 12 pages.

"Email discussion summary for [RAN-R18-WS-non-eMBB-Qualcomm]", 3GPP TSG RAN Rel-18 workshop, RWS-210590, Agenda Item: 4.2, Qualcomm, Jun. 28-Jul. 2, 2021, pp. 1-146.

"3rd Generation Partnership Project; Technical Specification Group Radio Access Network; NR; Sidelink Positioning Protocol (SLPP); Protocol specification (Release 18)", 3GPP TS 38.355, V18.0.0, Dec. 2023, pp. 1-76.

Office action received for corresponding European Patent Application No. 21778088.1, dated Oct. 15, 2024, 6 pages.

Office action received for corresponding Japan Patent Application No. 2024-517110, dated Jul. 14, 2025, 3 pages of office action and 5 pages of translation available.

Notice of Allowance received for corresponding European Patent Application No. 21778088.1, dated May 16, 2025, 7 pages.

5GAA Technical Report: "System Architecture and Solution Development; High-Accuracy Positioning for C-V2X", 56 pgs, Feb. 9, 2021.

3GPP TS 38.331 V16.4.1, 2021, 932 pgs.

ATIS.3GPP.38.855.V1600, 2019, 197 pgs.

* cited by examiner

DEVICE POSITIONING

RELATED APPLICATION

This application was originally filed as a Patent Cooperation Treaty Application No. PCT/EP2021/075574 filed on 17 Sep. 2021 which is hereby incorporated by reference in its entirety.

FIELD

The present disclosure relates to positioning of wireless communication devices.

BACKGROUND

Determining a location of a wireless communication node enables a number of different use cases, such as facilitating autonomous driving, locating distress signals, finding lost persons, predicting network loading and managing radio resources based on user distribution.

Locations of user equipments (UEs), user devices, terminal devices or other mobile devices, may be determined using several different methods. For example, satellite positioning, network-assisted positioning and multilateration may be used, separately or together, to derive an estimate of the UE location.

Direct communication between UEs may be referred to as device-to-device, D2D, or sidelink, communication. In direct communication, two UEs exchange information, or signals, directly in the sense that energy transmitted from a first UE is received in a second UE, such that the energy is not re-transmitted along the way by another node, such as a base station, for example. In other words, D2D and sidelink communication does not traverse a base station or other radio node, it is direct between the UEs. The sidelink resource allocation mode can be so called mode 1 where the sidelink resource allocation is provided by the network and so called mode 2 where the UE decides on sidelink transmission resources from a sidelink resource pool. In mode, 2 the UE may autonomously select sidelink resources from one or more resource pools given by access node system information, via dedicated signalling while inside access node coverage, or by pre-configuration while outside of access node coverage.

These sidelink services may be utilized in various scenarios ranging from direct automotive communication between vehicles (vehicle-to-vehicle, vehicle-to-everything, cellular vehicle-to-everything) to industrial automation with ultra-reliable-low-latency communication (URLLC) for mission- and business-critical applications. Sidelink connections may also be used for enhancing consumer communication experience in gaming and entertainment services with augmented reality/virtual reality/mixed reality by replacing Ultra-Wide Band, Bluetooth or Wi-Fi links, for example. Sidelink air interface may also be used in multi-hop relaying to provide coverage extension. The sidelink services may equally include services that relate to the management of connectivity with the access node.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to receive from a wireless network node, or determine autonomously, a sidelink positioning reference signal configuration comprising a constraint set, the constraint set comprising at least one constraint, each of the at least one constraint being based on at least one of: a location of the apparatus, a time instant, a time duration, a radio measurement, a physical characteristic of surroundings of the apparatus, a state of motion of the apparatus and a connection status of the apparatus to a network, determine whether at least one constraint in the constraint set is satisfied, and responsive to the at least one constraint in the constraint set being satisfied, transmit to a mobile device a first sidelink positioning reference signal and/or receive a second sidelink positioning reference signal from the mobile device.

According to a second aspect of the present disclosure, there is provided an apparatus comprising at least one processing core, at least one memory including computer program code, the at least one memory and the computer program code being configured to, with the at least one processing core, cause the apparatus at least to define a first mobile device as a target user equipment and at least one second mobile device as an anchor user equipment, transmit to each defined anchor user equipment a sidelink positioning reference signal configuration comprising a constraint set, the constraint set comprising at least one constraint, each of the at least one constraint being based on at least one of: a location of the anchor user equipment, a time instant, a time duration, a radio measurement, a physical characteristic of surroundings of the anchor user equipment, a state of motion of the anchor user equipment and a connection status of the anchor user equipment to a network, and participate in determining a location of the target user equipment based at least partly on results of measurements of sidelink positioning reference signals at the target user equipment and the anchor user equipment.

According to a third aspect of the present disclosure, there is provided a method comprising receiving in an apparatus from a wireless network node, or determining autonomously in the apparatus, a sidelink positioning reference signal configuration comprising a constraint set, the constraint set comprising at least one constraint, each of the at least one constraint being based on at least one of: a location of the apparatus, a time instant, a time duration, a radio measurement, a physical characteristic of surroundings of the apparatus, a state of motion of the apparatus and a connection status of the apparatus to a network, determining, in the apparatus, whether at least one constraint in the constraint set is satisfied, and responsive to the at least one constraint in the constraint set being satisfied, transmitting, from the apparatus to a mobile device a first sidelink positioning reference signal and/or receiving a second sidelink positioning reference signal from the mobile device in the apparatus.

According to a fourth aspect of the present disclosure, there is provided a method comprising defining a first mobile device as a target user equipment and at least one second mobile device as an anchor user equipment, transmitting to each defined anchor user equipment a sidelink positioning reference signal configuration comprising a constraint set, the constraint set comprising at least one constraint, each of the at least one constraint being based on at least one of: a location of the anchor user equipment, a time instant, a time duration, a radio measurement, a physical characteristic of surroundings of the anchor user equipment, a state of motion of the anchor user equipment and a connection status of the anchor user equipment to a network, and participating in determining a location of the target user equipment based at least partly on results of measurements of sidelink positioning reference signals at the target user equipment and the anchor user equipment.

According to a fifth aspect of the present disclosure, there is provided an apparatus comprising means for receiving in the apparatus from a wireless network node, or determining autonomously in the apparatus, a sidelink positioning reference signal configuration comprising a constraint set, the constraint set comprising at least one constraint, each of the at least one constraint being based on at least one of: a location of the apparatus, a time instant, a time duration, a radio measurement, a physical characteristic of surroundings of the apparatus, a state of motion of the apparatus and a connection status of the apparatus to a network, determining, in the apparatus, whether at least one constraint in the constraint set is satisfied, and responsive to the at least one constraint in the constraint set being satisfied, transmitting, from the apparatus to a mobile device a first sidelink positioning reference signal and/or receiving a second sidelink positioning reference signal from the mobile device in the apparatus.

According to a sixth aspect of the present disclosure, there is provided an apparatus comprising means for defining a first mobile device as a target user equipment and at least one second mobile device as an anchor user equipment, transmitting to each defined anchor user equipment a sidelink positioning reference signal configuration comprising a constraint set, the constraint set comprising at least one constraint, each of the at least one constraint being based on at least one of: a location of the anchor user equipment, a time instant, a time duration, a radio measurement, a physical characteristic of surroundings of the anchor user equipment, a state of motion of the anchor user equipment and a connection status of the anchor user equipment to a network, and participating in determining a location of the target user equipment based at least partly on results of measurements of sidelink positioning reference signals at the target user equipment and the anchor user equipment.

According to a seventh aspect of the present disclosure, there is provided a non-transitory computer readable medium having stored thereon a set of computer readable instructions that, when executed by at least one processor, cause an apparatus to at least receive from a wireless network node, or determine autonomously, a sidelink positioning reference signal configuration comprising a constraint set, the constraint set comprising at least one constraint, each of the at least one constraint being based on at least one of: a location of the apparatus, a time instant, a time duration, a radio measurement, a physical characteristic of surroundings of the apparatus, a state of motion of the apparatus and a connection status of the apparatus to a network, determine whether at least one constraint in the constraint set is satisfied, and responsive to the at least one constraint in the constraint set being satisfied, transmit to a mobile device a first sidelink positioning reference signal and/or receive a second sidelink positioning reference signal from the mobile device.

According to an eighth aspect of the present disclosure, there is provided a non-transitory computer readable medium having stored thereon a set of computer readable instructions that, when executed by at least one processor, cause an apparatus to at least define a first mobile device as a target user equipment and at least one second mobile device as an anchor user equipment, transmit to each defined anchor user equipment a sidelink positioning reference signal configuration comprising a constraint set, the constraint set comprising at least one constraint, each of the at least one constraint being based on at least one of: a location of the anchor user equipment, a time instant, a time duration, a radio measurement, a physical characteristic of surroundings of the anchor user equipment, a state of motion of the anchor user equipment and a connection status of the anchor user equipment to a network, and participate in determining a location of the target user equipment based at least partly on results of measurements of sidelink positioning reference signals at the target user equipment and the anchor user equipment.

According to a ninth aspect of the present disclosure, there is provided a computer program configured to cause an apparatus to perform at least the following, when run: receive from a wireless network node, or determine autonomously, a sidelink positioning reference signal configuration comprising a constraint set, the constraint set comprising at least one constraint, each of the at least one constraint being based on at least one of: a location of the apparatus, a time instant, a time duration, a radio measurement, a physical characteristic of surroundings of the apparatus, a state of motion of the apparatus and a connection status of the apparatus to a network, determine whether at least one constraint in the constraint set is satisfied, and responsive to the at least one constraint in the constraint set being satisfied, transmit to a mobile device a first sidelink positioning reference signal and/or receive a second sidelink positioning reference signal from the mobile device.

According to a tenth aspect of the present disclosure, there is provided a computer program configured to cause an apparatus to perform at least the following, when run: define a first mobile device as a target user equipment and at least one second mobile device as an anchor user equipment, transmit to each defined anchor user equipment a sidelink positioning reference signal configuration comprising a constraint set, the constraint set comprising at least one constraint, each of the at least one constraint being based on at least one of: a location of the anchor user equipment, a time instant, a time duration, a radio measurement, a physical characteristic of surroundings of the anchor user equipment, a state of motion of the anchor user equipment and a connection status of the anchor user equipment to a network, and participate in determining a location of the target user equipment based at least partly on results of measurements of sidelink positioning reference signals at the target user equipment and the anchor user equipment.

EMBODIMENTS

Figure 1:
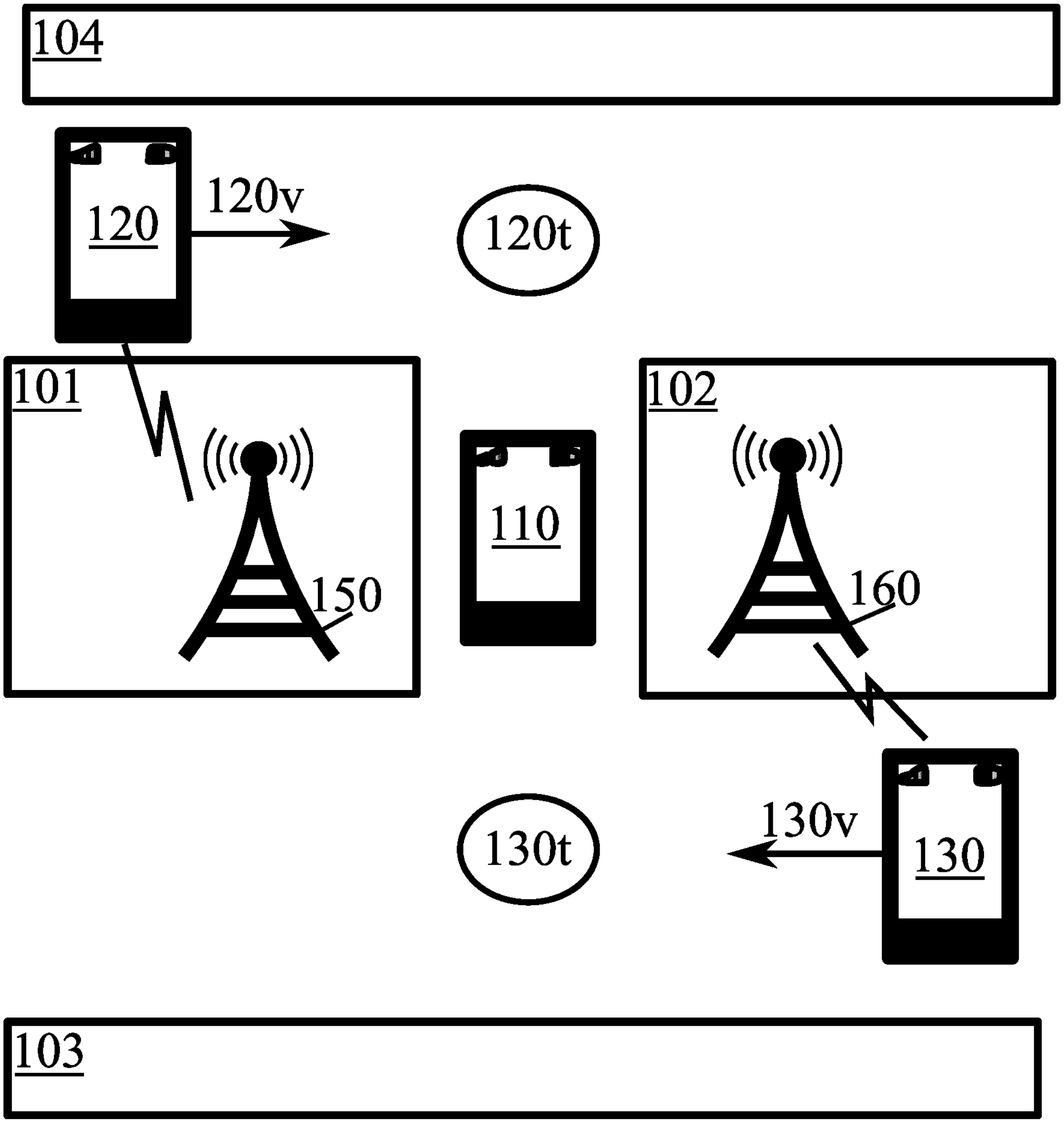
FIG. 1 illustrates an example system in accordance with at least some embodiments of the present invention.

The present disclosure describes methods to enhance the utility of sidelink positioning reference signals by controlling when, or in which circumstances the sidelink positioning reference signals are transmitted and received by UEs, to facilitate sidelink-enhanced positioning of a mobile device. This enhances the accuracy of positioning and avoids transmission of unnecessary sidelink positioning reference signals, which would consume energy and create interference in system spectrum resources.

The user device illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. Relay nodes may support multiple relay hops. IAB operation assumes a so-called split architecture having central unit, CU, and a number of distributed units, DUs. An IAB node contains two separate functionalities: DU part of the IAB node facilitates the gNB (access node) functionalities in a relay cell, that is, it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device, such as wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud computing or storage. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS), which is a system of collaborating computational elements controlling physical entities. CPS may enable the implementation and exploitation of massive amounts of interconnected devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units may be implemented.

5G enables using multiple input-multiple output (MIMO) antennas, many more base stations or nodes than the LTE, a so-called small cell concept, including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications. 5G is expected to have multiple radio interfaces, namely below 6 GHz, cmWave and mmWave, and also be capable of being integrated with existing legacy radio access technologies, RATs, such as long term evolution, LTE. Integration with LTE may be implemented, at least in the early phase, as a system, where macro coverage is provided by the LTE and 5G radio interface access comes from small cells by aggregation to LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet, or utilize services provided by them. The communication network may also be able to support the usage of cloud services, for example at least part of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using an edge cloud may comprise access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture may enable RAN real time functions being carried out at the RAN side in a distributed unit and non-real time functions being carried out in a centralized manner in a centralized unit.

It should also be understood that the distribution of functions between core network operations and base station operations may differ from that of the LTE or even be non-existent. Some other technology advancements probably to be used are Big Data and all-IP, which may change the way networks are being constructed and managed. 5G, also known as new radio, NR, networks are being designed to support multiple hierarchies, where MEC servers can be placed between the core and the base station or node B, referred to as gNB. It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

6G architecture is targeted to enable easy integration of everything, such as a network of networks, joint communication and sensing, non-terrestrial networks and terrestrial communication. 6G systems are envisioned to encompass machine learning algorithms as well as local and distributed computing capabilities, where virtualized network functions can be distributed over core and edge computing resources. Far edge computing, where computing resources are pushed to the very edge of the network, will be part of the distributed computing environment, for example in "zero-delay" scenarios. 5G systems may also employ such capabilities. More generally, the actual (radio) communication system is envisaged to be comprised of one or more computer programs executed within a programmable infrastructure, such as general-purpose computing entities (servers, processors, and like).

As a person skilled in the art will appreciate, the herein described system is only an example of a part of a radio access system and in practice, the system may comprise a plurality of user equipments and (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The base stations of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

FIG. 1 illustrates an example system in accordance with at least some embodiments of the present invention. Illustrated is an urban scenario, where streets are limited by buildings 101, 102, 103 and 104. UEs 110, 120 and 130 are located in the streets, and UE 110 is to be positioned. The UE to be positioned will herein be referred to as the target UE.

The network may determine, that using base stations 150 and 160 to position target UE 110 may produce a result which is not sufficiently accurate. Reasons for this may include that target UE 110 is not in communicative contact with sufficiently many base stations, or other wireless network nodes, to derive an accurate location estimate. For example, this may be the case where the target UE is near to an edge of cellular coverage, and/or where buildings or other objects obstruct radio paths to and from the target UE. The network may determine, for example at least partly responsive to the determination that positioning of target UE 110 would not be sufficiently accurate using base stations only, to use sidelink positioning reference signals to assist in positioning of target UE 110. Using the sidelink positioning reference signals increases UE positioning accuracy since the amount of information usable in deriving a location estimate for the target UE is increased. For example if the locations of assisting UEs, known as anchor UEs, are known, then measuring round-trip times to the UE to be positioned gives very useful information for reducing positioning inaccuracy. UEs may, in general, conduct measurements on sidelink position reference signals based on time, angle of arrival, received power and/or received phase, for example, to assist in estimating the position of the target UE. The results of such measurements may be reported to the network, which then may derive the location estimate. Location estimates of the anchor UE(s) may be used in deriving the location estimate for the target UE. The measurements and location estimates may be carried out when the terminal device is in a low activity mode, such as idle or in an inactive mode, and searching for an access node to access, or when the terminal device is performing a beam reselection in a connected mode with a base station. The idle mode, inactive mode and the connected mode may refer to respective radio resource control, RRC, connection idle, inactive and connected modes in 3rd generation partnership project, 3GPP, specifications.

In detail, the network may select UEs to participate in the sidelink-enhanced positioning process. Such UEs are referred to herein as anchor UEs, which are, in terms of FIG. 1, UEs 120 and 130. Selecting the anchor UEs may be based at least partly on their location, the accuracy at which they can be located and/or their state of motion or known trajectory, as will be described herein below in more detail. In some embodiments also characteristics of physical surroundings of potential anchor UEs are used in the selection of anchor UEs. For example, a UE on elevated ground may be a good candidate to act as anchor UE as its sidelink signals may be more easily received by other UEs. In particular, the network may select such UEs as anchor UEs which are capable of sending the sidelink positioning reference signals to target UE 110. They need not be able to send the sidelink positioning reference signals to the target UE 110 immediately, however.

As can be seen from FIG. 1, anchor UEs 120, 130 are blocked by buildings 101 and 102, respectively, from a direct line-of-sight, LOS, radio path to target UE 110. However, as indicated schematically in FIG. 1, the anchor UEs are in motion with anchor UE 120 moving in the direction indicated by velocity vector 120*v*, and anchor UE 130 moving in the direction indicated by velocity vector 130*v*. In particular, anchor UE 120 will, after a while, be in location 120*t* from which a LOS is available to target UE 110. Likewise, anchor UE 130 will, after a while, be in location 130*t* from which a LOS is available to target UE 110. As there may be a large number of potential anchor UEs in the streets, the network may choose the anchor UEs from among the potential ones such that they are in locations 120*t* and 130*t*, respectively, at the same time.

Figure 2:
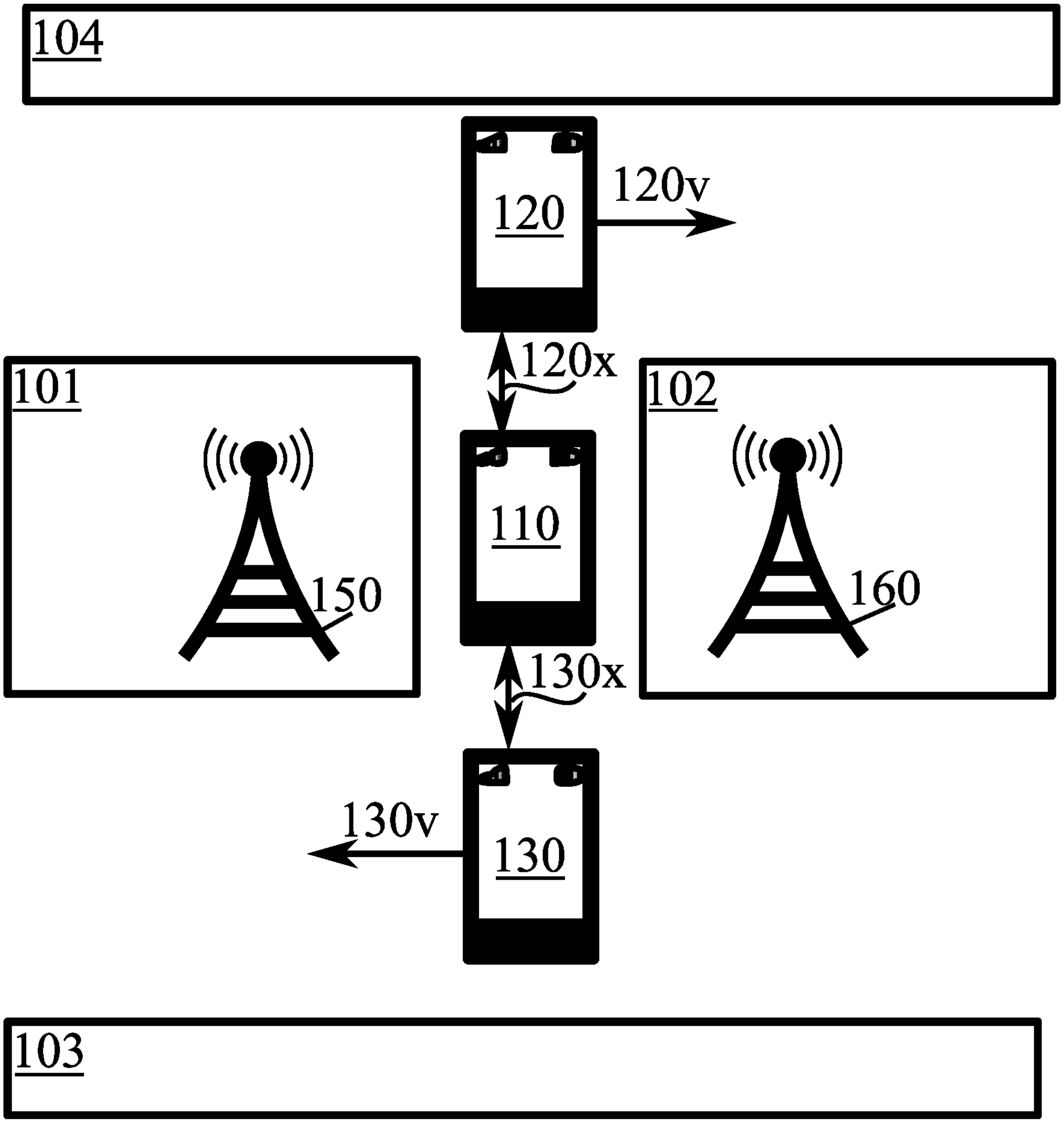
FIG. 2 illustrates an example system in accordance with at least some embodiments of the present invention.

FIG. 2 illustrates an example system in accordance with at least some embodiments of the present invention. Like numbering denotes like structure as in FIG. 1. In particular, FIG. 2 illustrates the system of FIG. 1 after a while has elapsed and anchor UEs 120, 130 are in their planned locations 120*t*, 130*t*, respectively, as discussed above. Both anchor UEs 120, 130 now have a LOS to the target UE and they may exchange sidelink positioning reference signals 120*x*, 130*x* with target UE 110. Where the UEs have beam-forming capability, they may transmit the sidelink positioning reference signal to the appropriate direction, which may be specified in a sidelink positioning reference signal configuration received from the network. They may also receive the reference signal from the appropriate direction, which may likewise be defined in the configuration received from the network. In other words, the network may configure the anchor UEs 120, 130 with the location coordinates and/or the time instant at which, if the UE approaches with sufficient proximity in the space and/or time domain, respectively, each anchor UEs is to transmit and/or receive sidelink positioning reference signals. Similarly, target UE 110 is configured to receive/transmit sidelink positioning reference signals from/to anchor UEs 120, 130 only at the configured time instant, wherein the time instant may be a time period with a start time and an end time.

Both anchor and target UEs may both receive and transmit sidelink positioning reference signals. Alternatively, only the target UE transmits sidelink positioning reference signals. As a yet further option, only the anchor UEs transmit the sidelink positioning reference signals. Whereas FIGS. 1 and 2 illustrate a case with two anchor UEs, this is an example only and using a single anchor UE will already enhance positioning accuracy by providing more information to derive the location estimate of the target UE 110. Also more than two anchor UEs may be used, where appropriate and where suitable candidate UEs are available. As participating in sidelink-enhanced positioning consumes some energy at the anchor UEs, using more anchor UEs than necessary is neither desirable nor useful. UEs which have received sidelink positioning reference signals may report results of the reception to the network.

Overall, therefore, sidelink positioning reference signals transmission and/or reception by the anchor or target UE is configured to take place at a certain location, time, and/or direction. Further, this transmission and/or reception may be configured to take place as a response to an event occurring, or an environmental constraint being satisfied. Namely, UEs may be configured to transmit/receive sidelink positioning reference signals only at a certain location and/or time, and/or with a certain direction. This approach enables highly mobile UEs to serve as anchor UEs, or get served as target UEs.

In addition to information describing mobility of the UEs involved in sidelink-assisted positioning, such as speed, heading and trajectory, radio channel conditions, such as LOS condition and interference level, UE capabilities such as multi-antenna/beamforming capability, and environmental conditions such as road layout and surrounding buildings may be used when determining constraints in the configuration for sidelink positioning reference signals in terms of when and where to transmit/receive it. The network may transmit the sidelink positioning reference signal configuration to the anchor and/or target UEs, and the UE will then transmit and/or receive the sidelink positioning reference signal when at least one constraint in the configuration received from the network is satisfied. For example, the configuration may define a moment in time when the reference signal is to be sent, such that the UE will transmit the reference signal at the specified moment, which is not the moment the configuration is sent but later. Mobility information of both the target and the anchor UE(s) may be used in compiling the sidelink positioning reference signal configuration. Mobility information shared by the UEs and used in compiling the configuration may include information related to their speed, absolute (in case of anchor UEs) or relative position, as well as their direction, heading, velocity, acceleration, trajectory, path, street, route, destination, arrival/departure point and/or area. In some embodiments, a physical characteristic of surroundings of the UE is defined in a constraint in the configuration to trigger transmission and/or reception of the sidelink positioning reference signals. For example, the physical characteristic of the surroundings may be that the UE is at an elevated position with respect to the surroundings. Another example is a constraint expressed in terms of a distance to an object in a direction specified in the constraint. When the distance from the UE to the object matches, exceeds or is shorter than the distance specified in the constraint, reception and/or transmission of the sidelink positioning reference signals is triggered.

When the UEs are under coverage of the communication network, the network can determine the sidelink positioning reference signal configuration by indicating, for example, the transmission/reception of the reference signals at a specific location or time, and transmit this configuration to anchor and target UEs. For partial or out-of-coverage operation, the network may pre-configure such sidelink positioning reference signal configurations and provide them to UEs proactively. In another embodiment, the configuration could be determined by the UEs autonomously, that is, without the need of a network entity. An example of an autonomously determined configuration is one where the transmission of the reference signal is constrained to occur as a response to a LOS radio path being detected between the anchor and target UE.

Figure 3A:
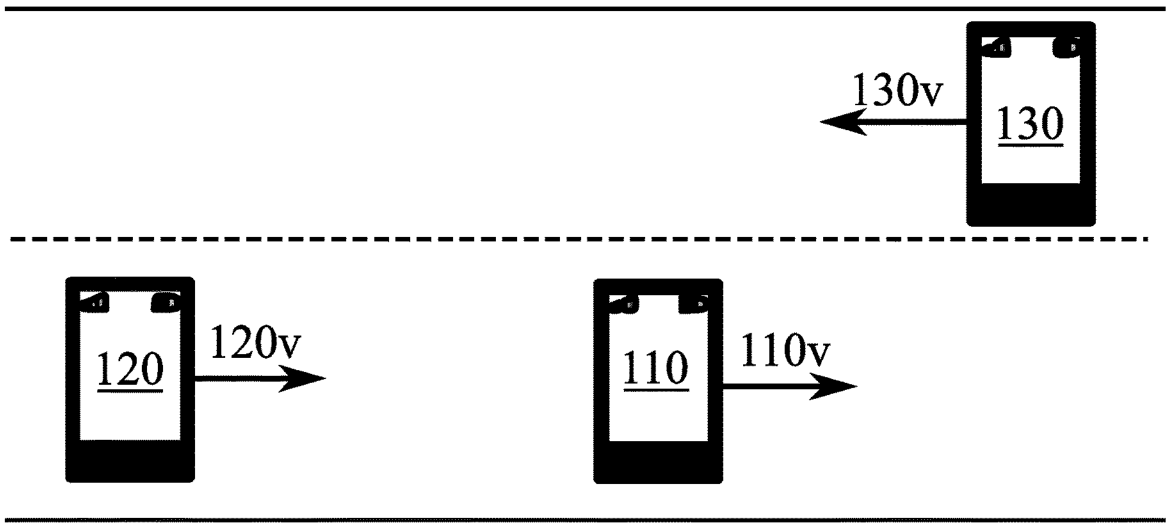
FIGS. 3A and 3B illustrate a vehicular embodiment in accordance with at least some embodiments of the present invention.
Figure 3B:
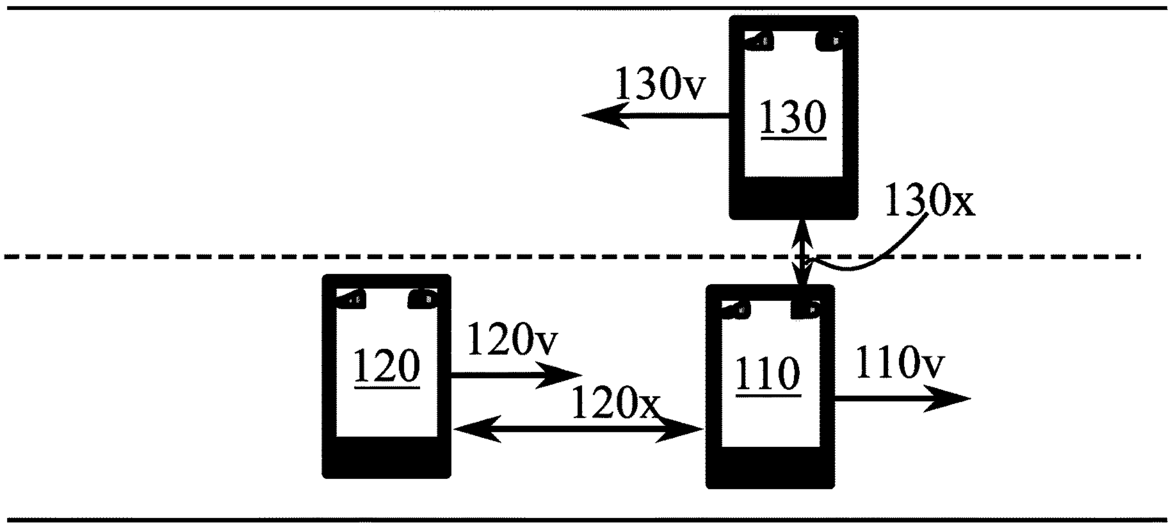

FIGS. 3A and 3B illustrate a vehicular embodiment in accordance with at least some embodiments of the present invention. Like numbering denotes like structure as in FIGS. 1 and 2. The embodiment illustrated is vehicular in the sense that the UEs are in vehicles, for example cars or trains, or the UEs are in fact these vehicles, such as autonomously driving cars. Target UE 110 is moving in the direction indicated by velocity vector 110*v*, in the same direction as anchor UE 120. Anchor UE 130 is proceeding in the opposite direction. In this case, the network can determine that while the UEs are in the situation of FIG. 3A apart from each other, after a while they will be closer together, as is illustrated in FIG. 3B.

The network may provide to each of UEs 110, 120 and 130 a sidelink positioning reference signal configuration which contains at least one constraint enabling the UE to decide when to transmit and/or receive the sidelink positioning reference signal. In FIGS. 3A and 3B, the constraint may be based on a location, a time instant or a characteristic of the location where the sidelink positioning reference signal is to be transmitted. When the constraint is based on location, the constraint specifies a location where the sidelink positioning reference signal is to be transmitted and received. The location may be specified in terms of geo-coordinates, a distance to a specific place, an angular relation to a specific place with respect to the device's heading and/or orientation, a geographic area or a coverage area of a cell, sector or site of a cellular communication system, for example. The network may derive this location by predicting where the UEs will be in a good position relative to each other to conduct the sidelink positioning reference signal transmission.

When the constraint is based on the time instant, the constraint may specify the time instant, or time period, explicitly or implicitly, when the sidelink positioning reference signal is to be transmitted and/or received. The network may derive this time instant by predicting a time, when the UEs will be in a good position relative to each other to conduct the sidelink positioning reference signal transmission.

When the constraint is based on the characteristic of the location where the sidelink positioning reference signal is to be transmitted, the network may define the constraint in terms of a distance between the target and anchor UE, or on a geographic feature of the location where the UEs are predicted, by the network, to be suitably close to each other. As is the case in the FIGS. 1-2 embodiment, the UEs may report back to the network results of measurements they conduct on the sidelink positioning reference signals.

As was the case in the FIGS. 1-2 embodiment, the network may, when the UEs support directional transmission and reception, specify a direction into which, and/or where from, the sidelink positioning reference signal is to be transmitted and/or received. Such a direction may be expressed as either an absolute direction with respect to geographical north or a relative direction with respect to the direction of motion of the device, for example.

Figure 4:
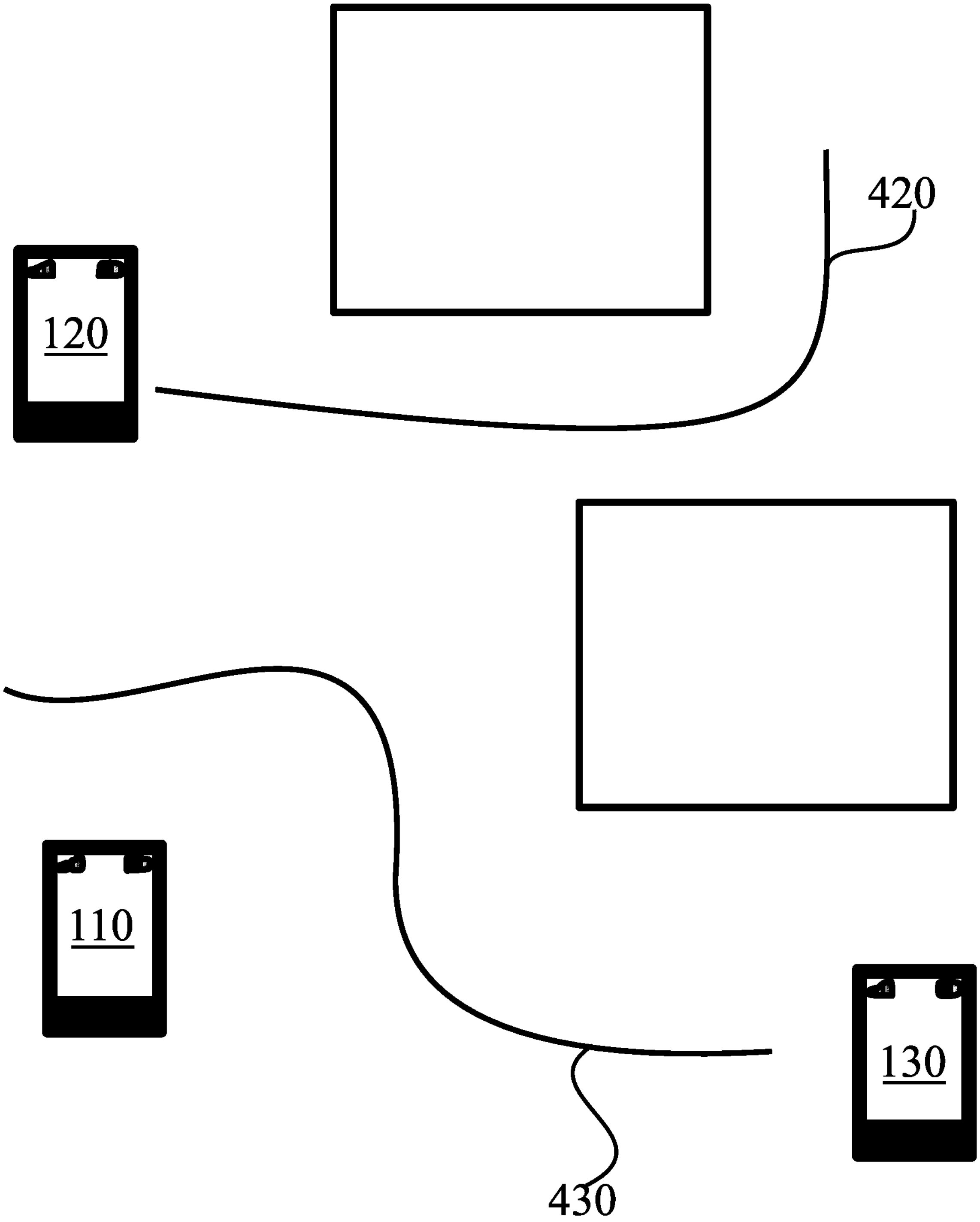
FIG. 4 illustrates an example system in accordance with at least some embodiments of the present invention.

FIG. 4 illustrates an example system in accordance with at least some embodiments of the present invention. In this embodiment, a factory environment is present, where some devices have predefined trajectories, for example, large automated guided vehicles may always follow a certain route across several zones of the factory. The route may correspond to rails installed on the ground that these vehicles travel on, for example. In detail, anchor UE 120 will follow trajectory 420, and anchor UE 430 will follow trajectory 430. On the other hand, some other mobile devices, such as small-sized robots or drones have an unknown path. In order to position such devices, which are the target UEs such as UE 110, the network may make use of the UEs with fixed paths as anchor UEs and exploit their pre-known locations to determine when they shall transmit/receive the sidelink positioning reference signal to position the target UE 110. In particular, the network can configure a specific duration with a certain direction where they transmit/receive sidelink positioning reference signals.

Pre-known locations along trajectories 420, 430 of the anchor UEs help in estimating the location of the target device, along with the measurements conducted on sidelink positioning reference signal by the devices. In another embodiment, the larger-sized anchor UEs might further have high processing power, thus they could also estimate the location information of the target UE 110, instead of a network entity, by collecting the sidelink positioning reference signal measurements from involved UEs for positioning.

Figure 5:
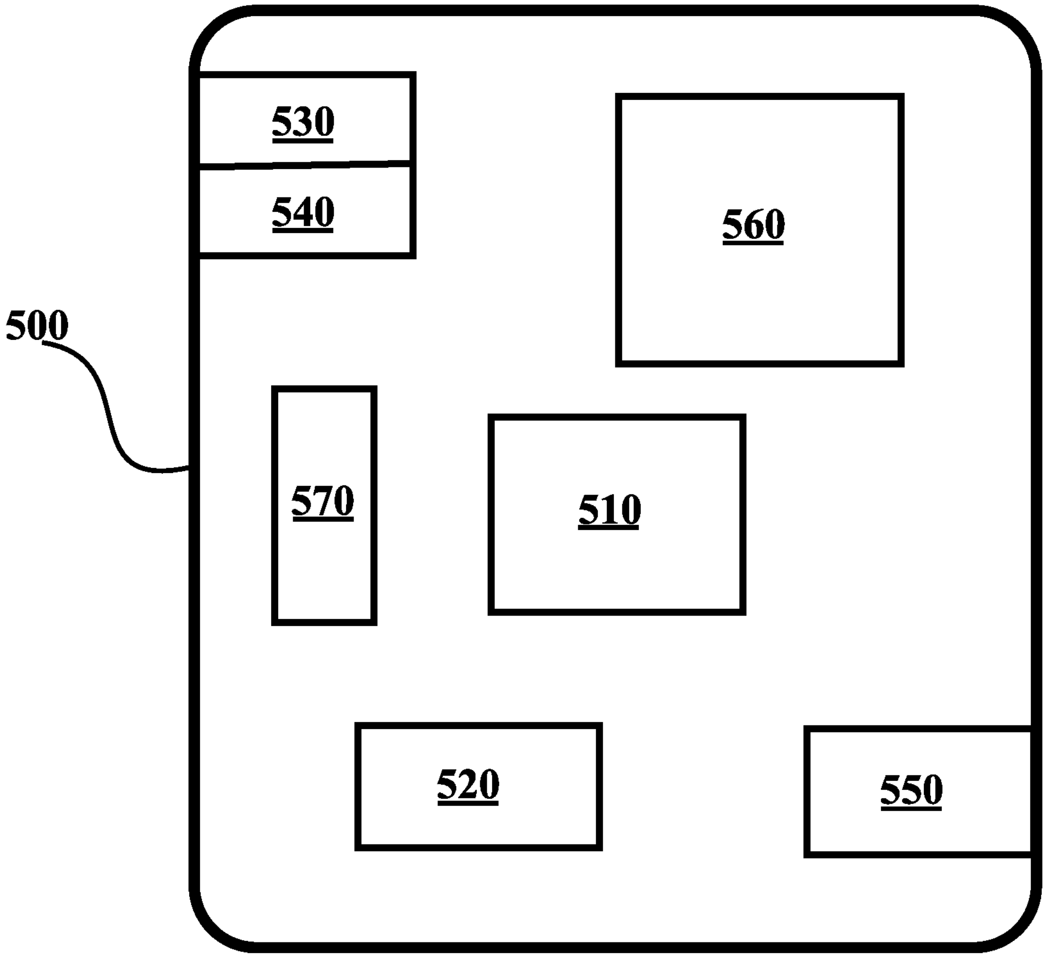
FIG. 5 illustrates an example apparatus capable of supporting at least some embodiments of the present invention.

FIG. 5 illustrates an example apparatus capable of supporting at least some embodiments of the present invention. Illustrated is device 500, which may comprise, for example, a mobile communication device such as UE 110, 120 or 130 of the FIGUREs, or a suitable network node, in applicable parts. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Zen processing core designed by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions, such as receiving, determining, transmitting or causing transmission, defining and participating.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 500 may comprise a near-field communication, NFC, transceiver 550. NFC transceiver 550 may support at least one NFC technology, such as NFC, Bluetooth, Wibree or similar technologies.

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to configure positioning parameters.

Device 500 may comprise or be arranged to accept a user identity module 570. User identity module 570 may comprise, for example, a subscriber identity module, SIM, card installable in device 500. A user identity module 570 may comprise information identifying a subscription of a user of device 500. A user identity module 570 may comprise cryptographic information usable to verify the identity of a user of device 500 and/or to facilitate encryption of communicated information and billing of the user of device 500 for communication effected via device 500.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some embodiments, device 500 lacks at least one device described above. For example, some devices 500 may lack a NFC transceiver 550 and/or user identity module 570.

Processor 510, memory 520, transmitter 530, receiver 540, NFC transceiver 550, UI 560 and/or user identity module 570 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

Figure 6:
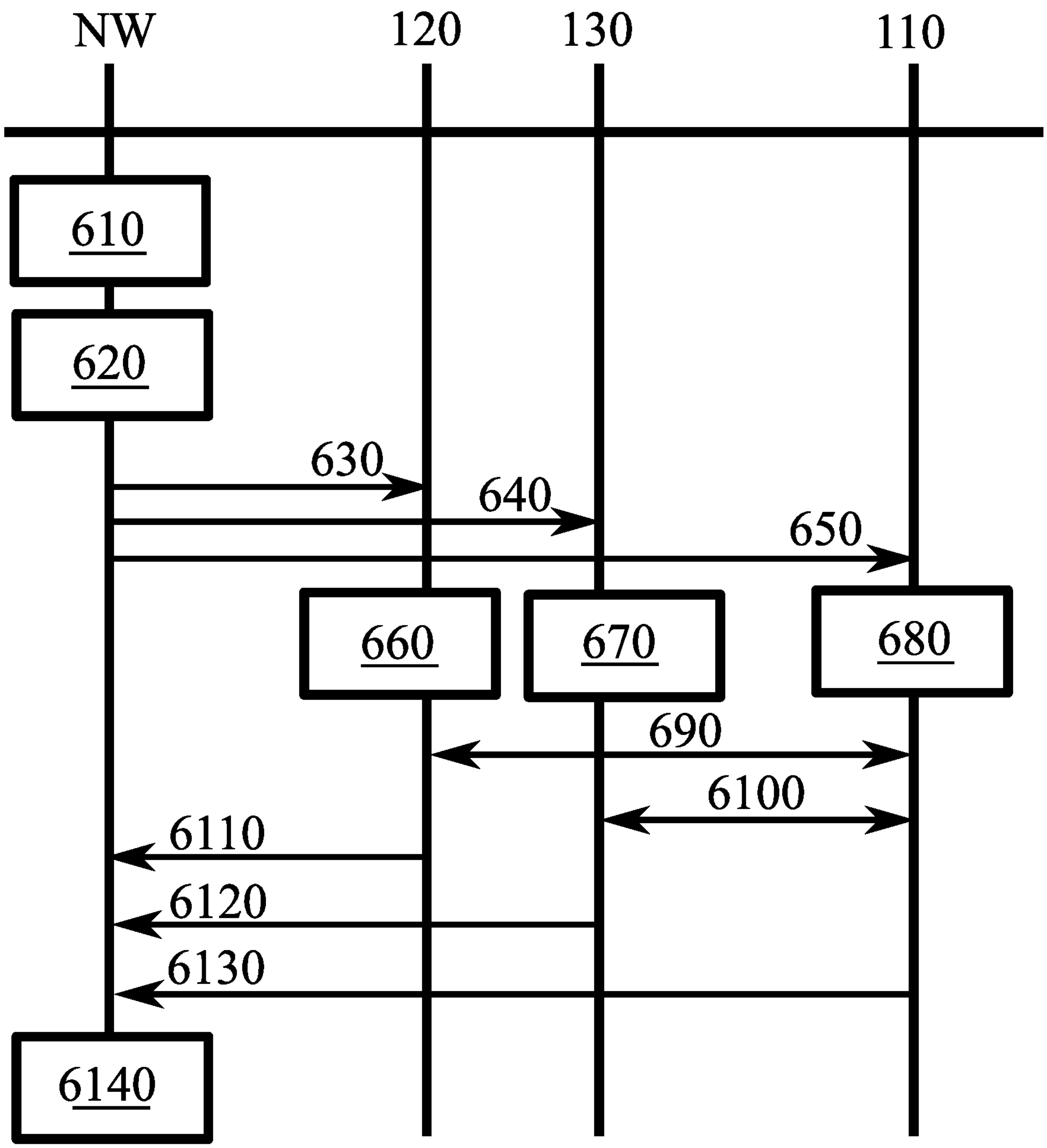
FIG. 6 illustrates signalling in accordance with at least some embodiments of the present invention.

FIG. 6 illustrates signalling in accordance with at least some embodiments of the present invention. On the vertical axes are disposed, on the left, a network node tasked with positioning, in the centre, anchor UEs 120, 130 and on the right, target UE 110. Time advances from the top toward the bottom. The number of anchor UEs may differ from the two illustrated.

In phase 610, the network node NW determines that UE 110 should be positioned, that is, a location estimate should be determined for UE 110. This may be based on a positioning request from UE 110 itself, or from a network dispatcher, for example. The node may also determine, that sidelink-assisted positioning is needed as accuracy may otherwise be insufficient. In phase 620, network node NW selects UEs other than UE 110 to act as anchor UEs. This selection may be based on at least one of: an accuracy at which the UEs may be positioned, a movement state of the UEs and a beamforming capability of the UEs. The network node also compiles sidelink positioning reference signal configurations which enable the UEs involved, that is the target UE and anchor UE(s), to decide when to transmit and/or receive the sidelink positioning reference signals. As noted above, in some embodiments both anchor and target UEs both transmit and receive these reference signals, whereas in other embodiments only anchor or target UE(s) transmit, with others receiving.

In phases 630, 640 and 650, the network provides the sidelink positioning reference signal configurations to the participating anchor and target UEs 120, 130 and 110, respectively. In the following phases 660, 670 and 680, the UEs monitor whether any of the constraints in these configurations are satisfied. In some embodiments, all the constraints in the configuration must be satisfied before the UE is to transmit and/or receive the reference signals, whereas in other embodiments it suffices that at least one of the constraint(s) is satisfied to trigger transmission and/or reception of the sidelink positioning reference signals.

The criteria in the configurations provided to the UEs are designed to be satisfied at roughly the same time, respectively. When this happens, anchor UE 120 exchanges the sidelink positioning reference signals with target UE 110 in phase 690 and anchor UE 130 exchanges the sidelink positioning reference signals with target UE 110 in phase 6100. The UEs conduct measurements on these reference signals, measuring parameters such as time of receipt, direction of receipt and/or signal power level upon receipt. In some embodiments, anchor UEs determine whether to transmit/receive the reference signals based on the accuracy of its own location information, such that if its own location is unreliable, the anchor UE may choose to abstain from sending the reference signals. In general, a decision to abstain from sending/receiving the reference signals may be based on a quality of service of a positioning capability of the anchor UE. The quality of service may be expressed in terms of latency, accuracy or integrity, for example.

The UEs report results of these measurements to the network in phases 6110, 6120 and 6130. Anchor UEs 120, 130 may include in these reports their own locations at the moment the reference signals were transmitted and/or received. Network node NW derives the location estimate for target UE 110 in phase 6140. The derivation of this location estimate may take as inputs not only sidelink-related measurements but also measurements conducted with target UE 110 via one or more base station.

Location-based constraints in the configuration may be expressed in terms of: absolute or relative location coordinates (e.g., specified in terms of GPS coordinates or distance with respect to a known location, such as the current location), a confidence interval of the specified relative location coordinates. For example, how close (in terms of offset threshold) to the given coordinates should the UE transmit or receive the reference signals. A geographical area or zone information (e.g., a rectangular area specified in terms of known coordinates or a geofence). A transmission reception point, cell, sector or site area (e.g., determined by radio resource management measurements, cell/TRP identifier or assistance data provided by the network).

In one embodiment, the sidelink positioning reference signal transmission is triggered in an area, configured by local coordinates. Herein the anchor UE radio link monitoring and/or measurement configuration is configured to determine if/when the UE has entered or left the configured sidelink positioning reference signal transmission area. When the radio link monitoring measurements are above a threshold and/or the anchor UE has entered the configured area, this triggers the transmission of the reference signal. Configured location aware reference signal transmission covers the configured area enabling targets UE(s) to receive reference signals. When entering the area, anchor UEs monitor that the area is valid and target UEs monitor the measurement quantity (e.g., RSRP) optionally reporting to anchor UE(s) the measurement quantity. In other words, in this embodiment the area where the sidelink positioning reference signal is transmitted is defined in criteria in the sidelink positioning reference signal configuration in terms of a signal power or quality level from at least one transmitter. Examples of such transmitters include signals from base stations. For example, the criteria may define that the sidelink positioning reference signals are sent while a signal power from a first base station is within a first interval and a signal power from a second base station is within a second interval.

Time criteria in the configuration may be expressed in terms of: absolute or relative time instance (e.g., specified in terms of UTC or number of subframes or relative time with respect to current time). A relative time instant may be expressed with respect to a previous location of the device, for example. A time window, e.g., combined with the above, with a specified start or end time/duration. A periodicity or frequency information, with a specified start/end time and/or duration, or a certain (set of) time/frequency resources (e.g., in terms of subframe, slot, resource block, resource element, subchannel, subcarrier, bandwidth part.

Directional criteria in the configuration may be expressed in terms of an antenna panel or element, beam, antenna radiation pattern or beam width, relative or absolute geographical direction, relative or absolute angle information or an angular confidence interval, such as a specified angular direction+/−a certain number of degrees.

Event based criteria in the configuration may be expressed in terms of motion, such as upon exceeding a certain speed or acceleration, or changing heading to a specified direction, upon or until entering, leaving or remaining within a specified area or zone, when a LOS radio path occurs to the target/anchor UE, or when a non-LOS radio path is detected to the target/anchor UE, based on channel conditions, e.g., upon/until sidelink channel measurements such as CBR, RSRP, RSSI, CSI, SINR, and Doppler spread remain below/exceed a specific threshold. The measurement may comprise also measuring the sidelink channel occupancy ratio, SL CR, and sidelink channel busy ratio, SL CBR, and the UE may use this information to select a low-occupancy beam. Further, radio measurements on uplink or downlink signals may be used in the criteria, as can connecting or disconnecting to/from a network or specific cell or TRP.

Quality-of-service, QoS, of the positioning request may be used to define criteria in the configuration. For example, anchor UEs may be allowed, based on the QoS, to decide whether they can transmit/receive requested SL PRS, e.g., based on the accuracy of their own location information or their energy level/status.

In another embodiment, another UE could configure the sidelink positioning reference signal configuration for anchor or target UEs, instead of the network. Similarly, a UE could perform location estimation calculation by collecting the measurements, instead of the network.

Figure 7:
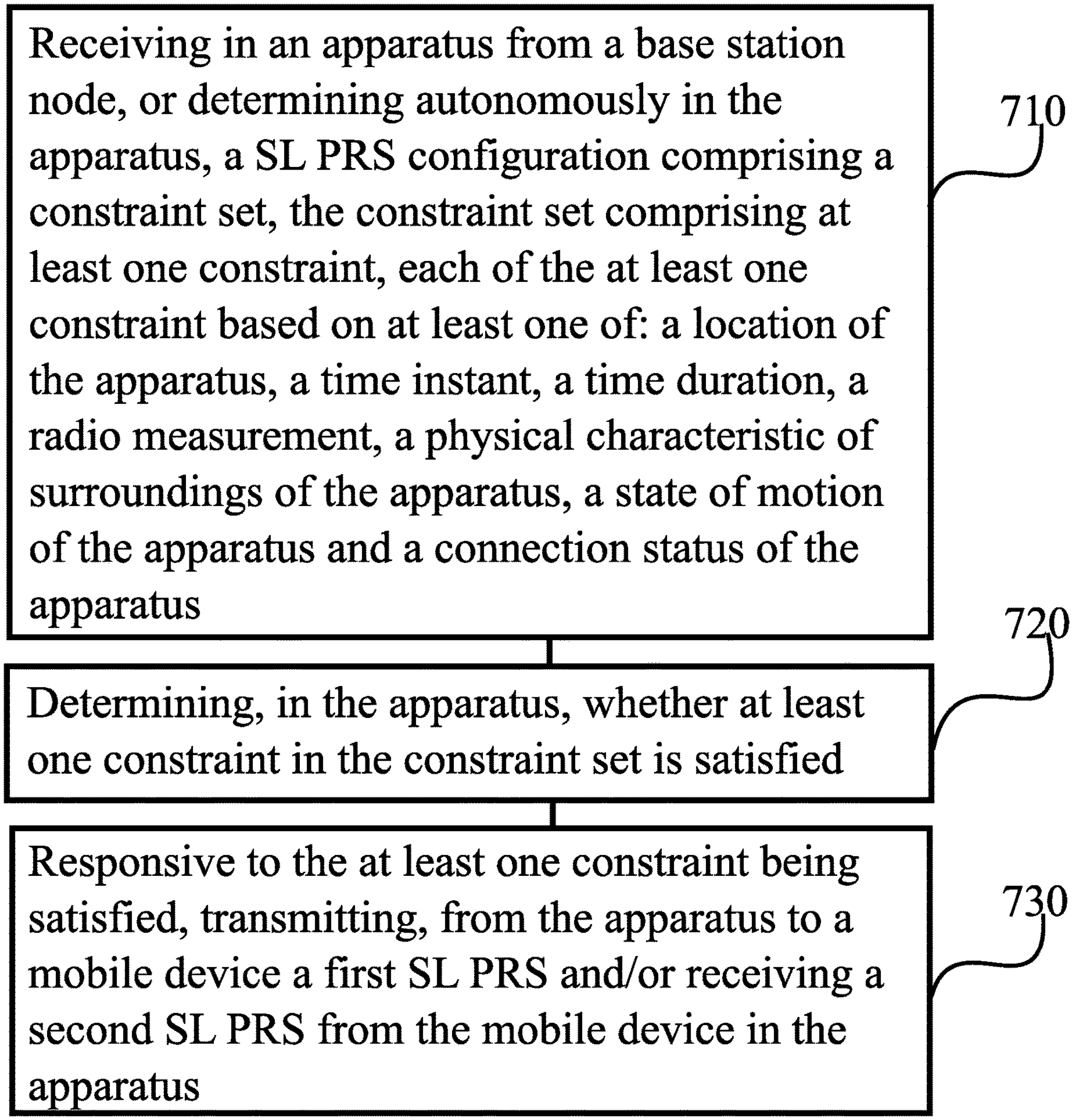
FIG. 7 is a flow graph of a method in accordance with at least some embodiments of the present invention.

FIG. 7 is a flow graph of a method in accordance with at least some embodiments of the present invention. The phases of the illustrated method may be performed in UE 110, or in a control device configured to control the functioning thereof, when installed therein.

Phase 710 comprises receiving in an apparatus from a base station node, or determining autonomously in the apparatus, a sidelink, SL, positioning reference signal, PRS, configuration comprising a constraint set, the constraint set comprising at least one constraint, each of the at least one constraint based on at least one of: a location of the apparatus, a time instant, a time duration, a radio measurement, a physical characteristic of surroundings of the apparatus, a state of motion of the apparatus and a connection status of the apparatus to a network. Phase 720 comprises determining, in the apparatus, whether at least one constraint in the constraint set is satisfied. Finally, phase 730 comprises, responsive to the at least one constraint in the constraint set being satisfied, transmitting, from the apparatus to a mobile device a first sidelink positioning reference signal and/or receiving a second sidelink positioning reference signal from the mobile device in the apparatus.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless positioning.

ACRONYMS LIST

TRP Transmission reception point
CBR Channel busy radio
CSI Channel state information
SINR Signal-to-interference-plus-noise ratio
RSRP Received signal receive power
RSSI Received signal strength indicator
UTC Coordinated universal time

REFERENCE SIGNS LIST

| | |
|---|---|
| 101, 102, 103, 104 | buildings |
| 110 | target UE |
| 120, 130 | anchor UEs |
| 150, 160 | base stations |
| 120t, 130t | locations |
| 120x, 130x | sidelink positioning reference signals |
| 110v, 120v, 130v | velocity vectors of UEs |
| 420, 430 | trajectories (FIG. 4) |
| 500-570 | structure of the device of FIG. 5 |
| 610-6140 | phases of the process illustrated in FIG. 6 |
| 710-730 | phases of the method of FIG. 7 |

The invention claimed is:

1. Anchor user equipment comprising at least one processing core, at least one memory including computer program code, the at least one memory and the computer program code being configured to, with the at least one processing core, cause the user equipment at least to:

receive, from a wireless network node, a sidelink positioning reference signal configuration comprising a constraint set, the constraint set comprising at least one constraint, each of the at least one constraint being based on at least one of: a location of the user equipment, a time instant, a time duration, a radio measurement, a physical characteristic of surroundings of the anchor user equipment, a state of motion of the anchor user equipment and a connection status of the anchor user equipment to a network, wherein the sidelink positioning reference signal configuration further comprises angle information, absolute or relative, on an angle from which a sidelink positioning reference signal is to be received and further comprises an angular confidence interval for the angle;

determine whether at least one constraint in the constraint set is satisfied, and responsive to the at least one constraint in the constraint set being satisfied, receive the sidelink positioning reference signal on said angle from a mobile device.

2. The anchor user equipment according to claim 1, wherein at least one of the at least one constraint is based on the location of the anchor user equipment, wherein the constraint based on the location of the anchor user equipment is satisfied when the anchor user equipment is in a location specified in the constraint.

3. The anchor user equipment according to claim 2, wherein the location in the constraint is specified in terms of one or more of the following:

geo-coordinates, a distance to a specific place or an object including another mobile or network node, an angular relation to a specific place with respect to the user equipment's heading and/or orientation, a geographic area or a coverage area of a cell, sector or site of a cellular communication system.

4. The anchor user equipment according to claim 1, wherein at least one of the at least one constraint is based on the time instant, wherein the constraint based on the time instant is satisfied when a current time matches is the time instant specified in the constraint.

5. The anchor user equipment according to claim 4, wherein the time instant in the constraint is specified in terms of one or more of the following: an absolute or relative time instant, a time window, a periodicity, a subframe slot, a resource block, subframe number, time slot, or resource element.

6. The user equipment according to claim 1, wherein at least one of the at least one constrain is based on the state of motion of the anchor user equipment, wherein the at least one constraint based on the state of motion of the anchor user equipment is satisfied when a current state of motion of the user equipment matches the state of motion of the anchor user equipment specified in the constraint.

7. A network node comprising at least one processing core, at least one memory including computer program code, the at least one memory and the computer program code being configured to, with the at least one processing core, cause the network node at least to:

define a first mobile device as a target user equipment and at least one second mobile device as an anchor user equipment;

transmit to each defined anchor user equipment a sidelink positioning reference signal configuration comprising a constraint set, the constraint set comprising at least one constraint, each of the at least one constraint being based on at least one of: a location of the anchor user equipment, a time instant, or a time duration, a radio measurement, a physical characteristic of surroundings of the anchor user equipment, a state of motion of the anchor user equipment and a connection status of the anchor user equipment to a network, wherein the sidelink positioning reference signal configuration further comprises angle information, absolute or relative, on an angle from which the anchor user equipment shall expect a sidelink positioning reference signal to be received and further comprises an angular confidence interval for the angle, and participate in determining a location of the target user equipment based at least partly on results of measurements of sidelink positioning reference signals at the anchor user equipment.

8. The network node according to claim 7, wherein the network node is configured to define the at least one second mobile device as anchor user equipment based at least partly on at least one of: a speed, a heading, a trajectory, a radio channel condition, a user equipment capability and an environmental condition relating to the at least one second mobile device.

9. A method comprising:

receiving, in an anchor user equipment from a wireless network node, a sidelink positioning reference signal configuration comprising a constraint set, the constraint set comprising at least one constraint, each of the at least one constraint being based on at least one of: a location of the anchor user equipment, a time instant, or a time duration, a radio measurement, a physical characteristic of surroundings of the anchor user equipment, a state of motion of the anchor user equipment and a connection status of the anchor user equipment to a network, wherein the sidelink positioning reference signal configuration further comprises angle information, absolute or relative, on an angle from which a sidelink positioning reference signal is to be received and further comprises an angular confidence interval for the angle;

determining, in the anchor user equipment, whether at least one constraint in the constraint set is satisfied, and responsive to the at least one constraint in the constraint set being satisfied, receiving the sidelink positioning reference signal from a mobile device by using the angle information in the anchor user equipment.

10. The method according to claim 9, wherein at least one of the at least one constraint is based on the location of the anchor user equipment, wherein the at least one constraint based on the location of the anchor user equipment is satisfied when the anchor user equipment is in a location specified in the constraint.

11. The method according to claim 10, wherein the location in the constraint is specified in terms of one or more of the following: geo-coordinates, a distance to a specific place, an angular relation to a specific place with respect to the anchor user equipment's heading and/or orientation, a geographic area or a coverage area of a cell, sector or site of a cellular communication system.

12. The method according to claim 11, wherein at least one of the at least one constraint is based on the time instant, wherein the at least one constraint based on the time instant is satisfied when a current time matches is the time instant specified in the constraint.

* * * * *